United States Patent [19]
Okazaki

[11] Patent Number: 5,253,102
[45] Date of Patent: Oct. 12, 1993

[54] OPTICAL WAVELENGTH CONVERTER SYSTEM

[75] Inventor: Yoji Okazaki, Kanagawa, Japan

[73] Assignee: Fuji Photo Film Co. Ltd., Kanagawa, Japan

[21] Appl. No.: 984,354

[22] Filed: Dec. 2, 1992

[30] Foreign Application Priority Data

Dec. 2, 1991 [JP] Japan ................... 3-317883
Mar. 25, 1992 [JP] Japan ..................... 4-67050

[51] Int. Cl.[5] ............................................. G02F 1/37
[52] U.S. Cl. ............................. 359/328; 359/326; 359/330; 372/22
[58] Field of Search .................... 359/326–332; 385/122; 372/21, 22

[56] References Cited

U.S. PATENT DOCUMENTS

| | | | |
|---|---|---|---|
| 4,701,929 | 10/1987 | Baer et al. | 372/71 |
| 4,865,406 | 9/1989 | Khanarian et al. | 385/122 |
| 5,028,107 | 7/1991 | Bierlein et al. | 385/122 X |
| 5,036,220 | 7/1991 | Byer et al. | 359/326 X |
| 5,113,469 | 5/1992 | Hatakoshi et al. | 385/122 |
| 5,121,250 | 6/1992 | Shinozaki et al. | 359/328 |
| 5,128,948 | 7/1992 | Papuchon et al. | 372/21 |
| 5,157,754 | 10/1992 | Bierlein et al. | 385/122 |

OTHER PUBLICATIONS

"Technical Digest of Conference on Lasers and Electro-Optics" in 1991, pp. 218–221. (May 1991).
"Interactions Between Light Waves in a Nonlinear Dielectric," Physical Review, vol. 127, No. 6, Sep. 15, 1962, pp. 1918–1939, Armstrong et al.

Primary Examiner—John D. Lee
Attorney, Agent, or Firm—Sughrue, Mion, Zinn, Macpeak & Seas

[57] ABSTRACT

An optical wavelength converter system which has a crystal of a first nonlinear optical material for converting an incoming laser beam into a second harmonic wave and a crystal of a second nonlinear optical material for converting the laser beam and the second harmonic wave into a sum frequency wave. A phase compensator plate is interposed between the crystal of the first nonlinear optical material and the crystal of the second nonlinear optical material, whereupon the laser beam and the second harmonic wave are aligned substantially in the same linear polarization before they enter the crystal of the second nonlinear optical material.

6 Claims, 2 Drawing Sheets

OPTICAL WAVELENGTH CONVERTER SYSTEM

BACKGROUND OF THE INVENTION

1. Field of the Invention

This invention relates to an optical wavelength converter system for shortening the wavelength of a laser beam, and more particularly, to an optical wavelength converter system in which a second harmonic wave is produced by the introduction of a laser beam into the crystal of a first nonlinear optical material and then a sum frequency is produced by the introduction of the laser beam together with the second harmonic wave into the crystal of a second nonlinear optical material.

2. Description of the Prior Art

An example of such a converter system is already known from, for example, U.S. Pat. No. 4,701,929 which discloses a laser-diode-pumped solid-state laser in which a solid-state laser rod doped with rare earth materials such as neodymium is pumped by a semiconductor laser, i.e., a laser diode. In order to obtain a laser beam having a shorter wavelength, in the case of this type of solid-state laser, a bulk single crystal of nonlinear optical material is disposed inside of the resonator of the laser for converting the wavelength of the beam, which is oscillated by the solid-state laser, into the wavelength of a second harmonic wave.

For the purpose of producing a laser beam having a much shorter wavelength, for instance, in a range of UV, as disclosed in "Technical Digest of Conference on Lasers and Electro-Optics" in 1991, pp. 218, attempts have been made to produce a sum frequency by the introduction, into a crystal of a second nonlinear optical material, of a laser beam oscillated by a solid-state laser and a second harmonic wave of the laser beam.

More specifically, in this type optical wavelength converter system, a YAG crystal, which is a medium for a solid-state laser, is pumped by light from a light source to produce a solid-state laser beam at a wavelength of 1064 nm, and then this solid-state laser beam is introduced into a KTP crystal which serves as a first nonlinear optical material to produce a second harmonic wave at a wavelength of 532 nm. The second harmonic wave thus obtained and the aforesaid solid-state laser beam are further introduced into a BBO crystal which serves as a second nonlinear optical material to produce a sum frequency at a wavelength of 355 nm.

This type of optical wavelength converter system is deemed useful in producing a laser beam with an ultra short wavelength, but inferior because of its very low wavelength conversion efficiency. This allows the converter system to produce only a pulse-like laser beam which permits an increase in power inside of the resonator, but not to produce a continuous laser beam which causes a lower inside power. As a specific example, when the oscillation of a solid-state laser was Q-switched with the use of a light source for the pump use, having an output of 5 kW, so that the power inside of the resonator could be increased and when two fundamental waves were phase matched, in type-I, with a sum frequency, the output of the sum frequency was reported to be 100 mW.

SUMMARY OF THE INVENTION

In view of the foregoing observations and description, a first object of this invention is to provide an optical wavelength converter system which is capable of producing a successive laser beam having an ultra short wavelength by the production of a second harmonic wave and a sum frequency wave, and which is improved in wavelength conversion efficiency to a much greater extent.

Another object of this invention is to provide an optical wavelength converter which is capable of preventing an optical loss.

To these ends, according to one aspect of this invention, there is provided an optical wavelength converter system, in which a second harmonic wave is produced by the introduction of a linear polarized laser beam into the crystal of a first non-linear optical material, and in which a sum frequency is generated by the introduction, into the crystal of a second non-linear optical material, of the second harmonic wave together with the laser beam, the improvement comprising:

a phase compensator means being disposed in the optical path of the laser beam and the second harmonic wave, both of which enter the crystal of the second non-linear optical material, so that the laser beam and the second harmonic wave are aligned substantially in the same plane of linear polarization.

According to a second aspect of this invention, there is provided an optical wavelength converter system, in which a second harmonic wave is produced by the introduction of a linear polarized laser beam into the crystal of a first non-linear optical material, and in which a sum frequency is generated by the introduction, into the crystal of a second non-linear optical material, of the second harmonic wave together with the laser beam, the improvement comprising:

a crystal, for use as the crystal of the first non-linear optical material, which is provided with a periodically domain-inverted structure for matching, in phase, the laser beam with the second harmonic wave.

According to a third aspect of this invention, there is provided an optical wavelength converter system, in which a second harmonic wave is produced by the introduction of a linear polarized laser beam into the crystal of a first non-linear optical material, and in which a sum frequency is generated by the introduction, into the crystal of a second non-linear optical material, of the second harmonic wave together with the laser beam, the improvement comprising:

a crystal of a non-linear optical material which is commonly used for both the crystals of the first and the second optical materials, and which includes a first periodically-domain inverted structure to match, in phase, the laser beam and the second harmonic wave, and a second periodically-domain inverted structure to match, in phase, the laser beam, the second harmonic wave and the sum frequency with one another.

The periodically domain-inverted structure employed in the system, according to the second and third aspects of this invention, is such that domains of a ferroelectric element, which element possesses a nonlinear optical effect, are periodically inverted. A technique employing such a structure has already been proposed by Bleombergen et al. in Physical Review, vol. 127, No. 6, 1918 (1962) in which the wavelength of the fundamental wave is converted to the wavelength of a second harmonic wave by the use of the crystal of a nonlinear optical material having the periodically domain-inverted structure. According to this technique, the fundamental wave can be phase matched with the second harmonic wave by setting the period of domain reversals so as to be an integral multiple of a coherence length Λc. The coherence length is given by $$\Lambda c = 2\pi/\{\beta(2\omega) - 2\beta(\omega)\} \quad (1)$$

where $\beta(2\omega)$ designates the propagation constant of the second harmonic wave; and $2\beta(\omega)$, the propagation constant of the fundamental wave. When the wavelength conversion is effected by the use of a bulk crystal of a nonlinear optical material, dispensing with the periodically domain-inverted structure, a phase matched wavelength is limited to a specific wavelength inherent in the crystal. However, the foregoing technique enables the efficient phase matching of an arbitrary wavelength by the setting of the period Λ which satisfies the equation (1).

In order to produce a sum frequency from the fundamental wave and the second harmonic wave, an appropriate phase matching is effected among the fundamental wave, the second harmonic wave, and the sum frequency by the setting of the period Λ of the domain reversals so as to be an integral multiple of the coherence length Λc. The coherence Λc is given by $$\Lambda c = 2\pi/[\eta(\omega_3) - \{\beta(\omega_2)\}] \quad (2)$$

where $\beta(\omega_3)$ designates the propagation constant of the sum frequency; $\beta(\omega_1)$, the propagation constant of the fundamental wave; and $\beta(\omega_2)$, the propagation constant of the second harmonic wave.

In general, when a linear-polarized laser beam (hereinafter referred to as fundamental wave), such as the foregoing laser beam oscillated by the solid-state laser, is introduced into the crystal of a first nonlinear optical material to produce a second harmonic wave, the second harmonic wave thus produced tends to be rotated with respect to the plane of polarization of the fundamental wave. For instance, when the type-II phase matching is effected by the use of the foregoing KTP crystal, the angle of rotation will be about 45°.

Moreover, when the two fundamental waves are phase matched, in type-I, with a sum frequency inside a BBO crystal which serves as a second nonlinear optical material, a maximum efficiency of wavelength conversion tends to be achieved only when the two fundamental waves lie in the same plane of polarization.

On this point, however, as previously described in the conventional optical converter system, the second harmonic wave, with the plane of polarization thereof being rotated, is usually introduced, as one of the two fundamental waves, into the crystal of a second nonlinear optical material. As a result of this, it is believed that the difference in the plane of polarization between the two fundamental waves which enter the crystal impairs the efficiency of wavelength conversion of the conventional system.

Such a drawback in the conventional system can be overcome by the provision of a phase compensator between the first and second wavelength converter means as exemplified in the first preferred mode; namely, the phase compensator causes two fundamental waves which enter the second wavelength converter means of a second nonlinear optical material to be substantially matched with each other in a single linear polarization, thereby achieving a highly efficient wavelength conversion.

In the case of the optical wavelength converter system as exemplified in the second and third preferred modes, the inevitable use of diagonal terms in the nonlinear optical constants, in converting the fundamental wave into a second harmonic wave by introducing it into the periodically domain-inverted structure of the nonlinear optical material, prevents the plane of polarization of the second harmonic wave from being rotated relative to that of the fundamental wave. Thus, the above system also assures the substantial matching, in the single linear polarization, between the second harmonic wave and the fundamental wave, both of which enter a sum-frequency generator (the second optical wavelength converter means in the second preferred mode, and the second periodically domain-inverted structure in the third preferred mode), thereby realizing a highly efficient wavelength conversion.

The optical wavelength converter system, according to the second and third preferred modes, are superior to the system according to the first preferred mode, in view of the wavelength conversion efficiency, in that the system, according to the second and third preferred modes, dispenses with the phase compensator used in the first preferred mode, which eliminates an optical loss caused by the phase compensator.

Particularly, in the optical wavelength converter system according to the third preferred mode, since the crystal of the nonlinear optical material for producing a second harmonic wave and the crystal of the nonlinear optical material for producing a sum frequency are integrated into a single element, the resulting converter system has two less facets when compared with the system according to the first and second preferred modes. Hence, the system according to the third preferred mode can be said to be much superior because of its reduced optical loss and its higher efficiency.

Furthermore, as previously described in the second and third preferred modes, the inevitable use of the diagonal terms of the nonlinear optical constants, which are generally of values considerably larger than non-diagonal terms, leads to a wavelength conversion improved in efficiency to a much greater extent.

DETAILED DESCRIPTION OF THE PREFERRED EMBODIMENTS

Referring to the accompanying drawings, preferred embodiments of this invention will be described in detail hereinbelow.

Figure 1:
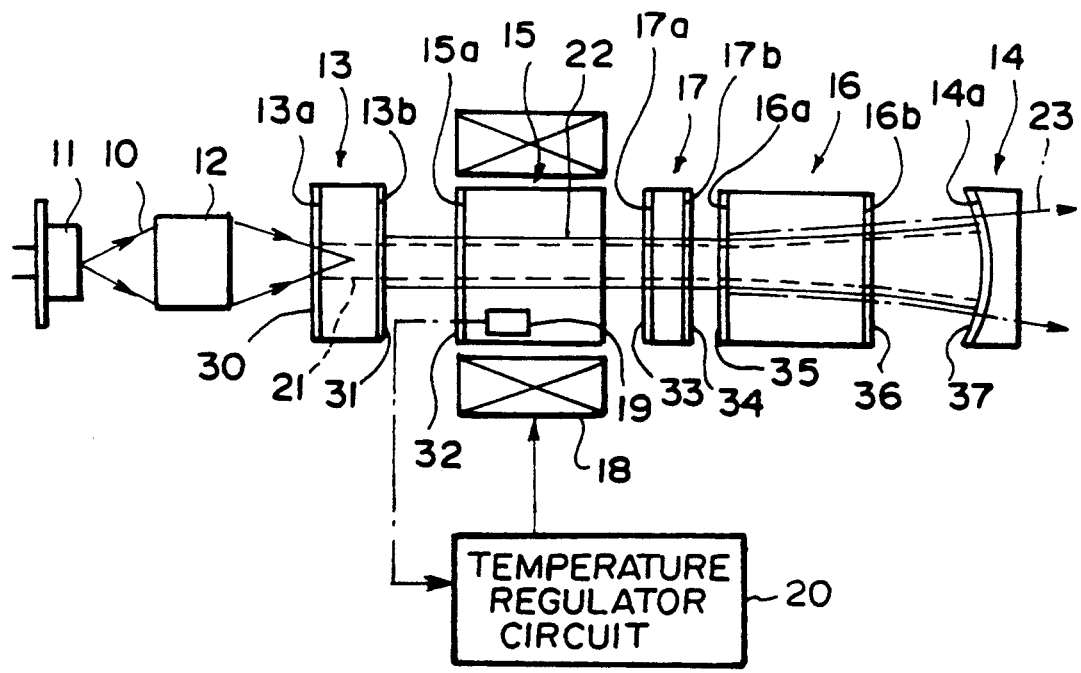
FIG. 1 is a diagrammatic side-sectional view showing an optical wavelength converter system according to a first embodiment of this invention.

FIG. 1 is a schematic representation of an optical wavelength converter system according to a first embodiment of this invention. As one specific exemplification, the optical wavelength converter system is incorporated into a laser-diode-pumped solid-state laser. This laser-diode-pumped solid-state laser is composed of a semiconductor laser (a phase-coupled array laser) 11 for emanating a laser beam 10 as a pumping radiation, a condenser lens 12 which is made up of an element such as a rod lens for converging the laser beam 10, which is diverged, a YVO$_4$ rod 13 (hereinafter referred to as Nd:YVO$_4$ rod), which is a solid-state laser rod doped with neodymium (Nd), and a resonant mirror 14 disposed forwardly (on the right side on the drawing) of the Nd:YVO$_4$ rod 12. Between the Nd:YVO$_4$ rod 13 and the resonant mirror 14 are disposed, from the Nd:YVO$_4$ rod 13, a KTP crystal 15 as the crystal of a first nonlinear optical material and a BBO crystal 16 as the crystal of a second nonlinear optical material. Between the crystals 15 and 16 is further disposed a phase compensator 17 whose function will be described later. The temperature of the KTP crystal 15 is regulated at a desired level by means of Peltier elements 18, a temperature sensor 19 for sensing the temperature of the crystal and a temperature regulator circuit 20 for driving the Peltier elements upon reception of an output from the temperature sensor 19.

The elements set forth above are mounted in a non-illustrated common housing in an integrated fashion. The temperature of the phase-coupled array laser 11 is regulated at a predetermined level by means of non-illustrated Peltier elements associated with a non-illustrated temperature regulator circuit.

In this embodiment, the phase-coupled array laser 11 is employed as a laser which emits a laser beam at a wavelength of $\lambda_1 = 809$ nm. The Nd:YVO$_4$ rod 13 emanates a plane-polarized laser beam 21 at a wavelength of $\lambda_2 = 1064$ nm when neodymium atoms are excited by the laser beam 10. This laser beam 21 enters the KTP crystal 15, and is converted into a second harmonic wave 22 at a wavelength of $\lambda_3 = \lambda_2/2 = 532$ nm. The second harmonic wave 22 and the laser beam 21 enter the BBO crystal 16, and are converted into a sum frequency wave at a wavelength of $\lambda_4 = 355$ nm. Here, $1/\lambda_2 + 1/\lambda_3 = 1/\lambda_4$.

A rear-side end surface 13a and a front-side end surface 13b of the Nd:YVO$_4$ rod 13 are covered with a coating 30 and a coating 31, respectively; a rear-side end surface 15a of the KTP crystal 15 with a coating 32; a rear-side end surface 17a and a front-side end surface 17b of the phase compensator 17 with a coating 33 and a coating 34, respectively; a rear-side end surface 16a and a front-side end surface 16b of the BBO crystal 16 with a coating 35 and a coating 36, respectively; and a concave-shaped mirror surface 14a of the resonant mirror 14 with a coating 37. The behavior of each coating at wavelengths is shown in the following table respectively for $\lambda_1 = 809$ nm, $\lambda_2 = 1064$ nm, $\lambda_3 = 532$ nm and $\lambda_4 = 355$ nm. In the table, AT designates a no reflection (transmissivity of 99% or more); and HR, a high reflection (reflectivity of 99.9% or more).

TABLE 1

|  | $\lambda_1$ | $\lambda_2$ | $\lambda_3$ | $\lambda_4$ |
| --- | --- | --- | --- | --- |
| coating 30 | AR | HR | AR | — |
| coating 31 | — | AR | HR | — |
| coating 32 | — | AR | AR | — |
| coating 33 | — | AR | AR | — |
| coating 34 | — | AR | AR | — |
| coating 35 | — | AR | AR | HR |
| coating 36 | — | AR | AR | AR |
| coating 37 | — | HR | HR | AR |

The use of the coatings 30 through 37 causes the oscillation of the laser beam 21 between the rear-side end surface 13a of the Nd:YVO$_4$ rod 13 and the mirror surface 14a. Since the laser beam entering the KTP crystal 15 is being oscillated, the laser beam can be introduced into the crystal with a high power, whereupon a second harmonic wave 22 is efficiently produced. This second harmonic wave 22 further undergoes oscillation between the end surface 13b of the Nd:YVO$_4$ rod 13, coated with the coating 31, and the mirror surface 14a, coated with the coating 37, and subsequently enters the BBO crystal 16, along with the oscillated laser beam 21. As such, the laser beam 21 and the second harmonic wave 22 with a high output can also be introduced into the BBO crystal 16. A sum frequency 23 then passes through the resonant mirror 14a directly, or after it is reflected by the end surface 16a of the BBO crystal 16 which is covered with the coating 35.

The laser beam 21 and the second harmonic wave 22 are phase matched, in type-II, with each other in the KTP crystal 15. This causes the second harmonic wave 22 to be rotated, in the plane of polarization, at an angle of about 45 relative to the laser beam 21. On the other hand, the BBO crystal 16 effects a type-I phase matching between the fundamental waves, which are composed of the laser beam 21 and the second harmonic wave 22, and the sum frequency 23. The phase compensator 17 adjusts the phase of the laser beam 21 and the second harmonic wave 22 so that the laser beam and the second harmonic wave, being different from each other in the plane of polarization at an angle of about 45°, can be aligned substantially in a single linear polarization.

The entrance of the laser beam 21 and the second harmonic wave 22, both which are aligned in a single plane of polarization, into the BBO crystal 16, leads to an appropriate type-I phase matching, whereby they are efficiently converted into the sum frequency 23. In practice, according to the first embodiment, a sum frequency of 1 mW was obtained when the output of the phase-coupled array laser 11 was 500 mW.

The second harmonic wave 22 is different, in the plane of polarization, from the laser beam 21 by an angle of about 45 as described above, and this difference is variable depending on the temperature of the KTP crystal 15. The temperature of the KTP crystal 15 is, however, regulated by means of the foregoing temperature regulator circuit. Accordingly, as long as the correction angle of the compensator 17 is precisely in accordance with the difference in the plane of polarization mentioned above, the regulation of the temperature of the KTP crystal 15, by means of the temperature regulator means, assures the matching, in the plane of polarization, of the laser beam 21 and the second harmonic wave 22 when they enter the BBO crystal 16, thereby achieving a type-I phase matching improved to a greater extent.

Figure 2:
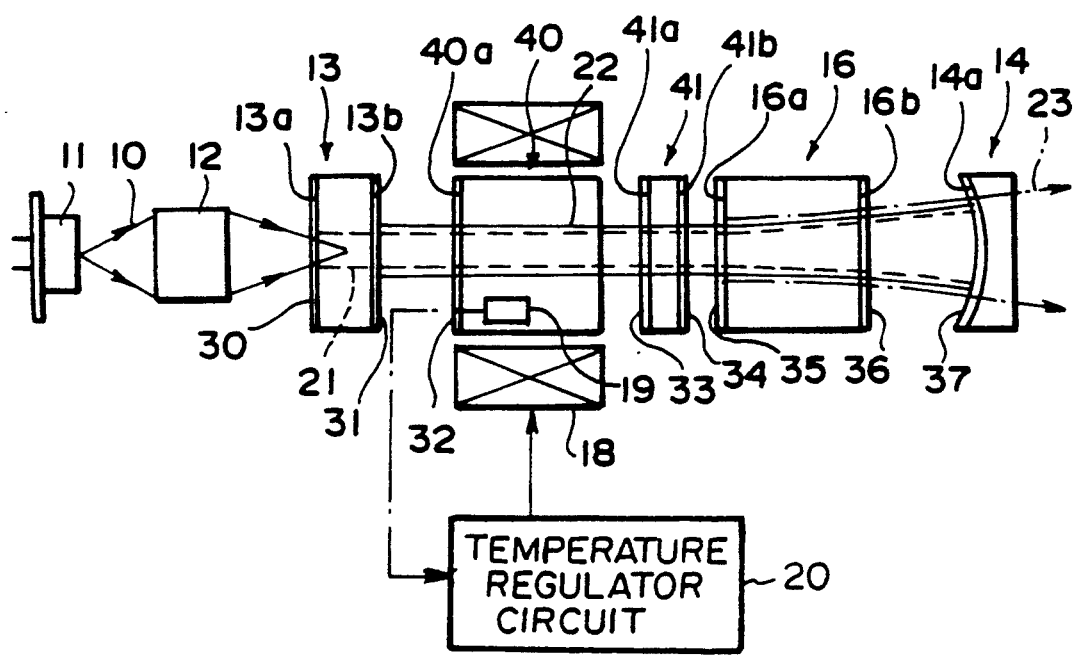
FIG. 2 is a diagrammatic side-sectional view showing an optical wavelength converter system according to a second embodiment of this invention.

Upon reference to FIG. 2, a second embodiment of the present invention will be described. Throughout the drawings, the same reference numerals are provided to designate the corresponding features in FIG. 1, and the explanation thereof will be omitted here for clarity.

The optical wavelength converter system, according to a second embodiment of this invention, employs a BBO crystal 40 instead of the KTP crystal 15 used in the first embodiment and a phase compensator 41 instead of the phase compensator 17. As with the first embodiment, the rear-side end surface 40 of the BBO crystal 40, side surfaces 41a and 41b on both sides of the phase compensator 41 are covered with coatings 32, 33 and 34, respectively. In the BBO crystal 40, which serves as the crystal of the first nonlinear optical material, the laser beam 21 is phase matched in type-II with the second harmonic wave 22, and the second harmonic wave 22 is rotated, in the plane of polarization, at an angle of about 45° relative to the laser beam 21. The phase compensator 41 adjusts the phase of the laser beam 21 and the second harmonic wave 22 in such a manner that a difference in the plane of polarization at an angle of about 45° is canceled. Accordingly, as with the first embodiment, the sum frequency 23 is efficiently produced as a result of the appropriate type-I phase matching between the laser beam 21 and the second harmonic wave 23 by means of the BBO crystal 16.

In the same manner as the first embodiment, an accurate phase matching between the laser beam 21 and the second harmonic wave 22, which enter the BBO crystal 16, can be assured by the adjustment of the temperature of the BBO crystal 40.

It is to be noted that the means for regulating the temperature of the BBO crystal 40, or the KTP crystal 15 of the first embodiment, is not always necessary, but preferable in improving the conversion efficiency as set forth in the above.

In a modified embodiment, the BBO crystal may be replaced with an LBO crystal, or the like. The Nd:YVO$_4$, which acts as a laser medium, may also be replaced with an element such as an Nd:YLF, an Nd:YAG, an NAB, an Nd:LiNbO$_3$, an NYAB, or an LNP.

Figure 3:
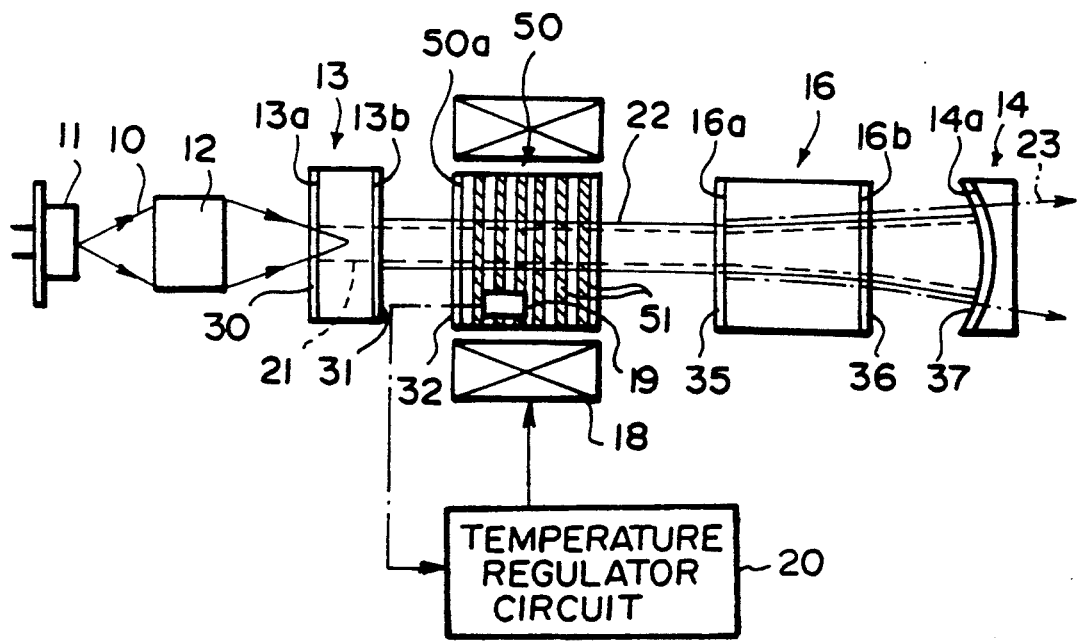
FIG. 3 is a diagrammatic side-sectional view showing an optical wavelength converter system according to a third embodiment of this invention.

With reference to FIG. 3, a third embodiment of this invention will be described hereunder. An optical wavelength converter system, according to the third embodiment, is different from the system of the first embodiment in that the system uses an LT (LiTaO$_3$) crystal 50 instead of the KTP crystal 15 and dispenses with the phase compensator 17.

The LT crystal 50, which serves as a nonlinear optical material, is ground in such a manner that facets of the crystal parallel to the z axis permit the transmission of rays, whereby the largest nonlinear optical constant $d_{33}$ of the LT crystal can be effectively used. The LT crystal 50 is provided with a periodically domain-inverted structure 51 in which domain reversals are arrayed in a segmented manner in the direction of the optical transmission. This periodically domain-inverted structure 51 can be fabricated by the definition of a predetermined periodical pattern onto a uni-polarized LT crystal 50 with the radiation of electrons using, for instance, an electron beam plotting device. In this embodiment, the period A of the periodically domain-inverted structure 51 is set to 8 μm. The rear-side end surface 50a of the LT crystal 50 has the same coating 32 as the KTP crystal 15 in the system according to the first embodiment.

The laser beam 21 being emitted as a fundamental wave at a wavelength of 1064 nm is converted into a second harmonic wave 22 at 532 nm by means of the aforementioned LT crystal 50. This second harmonic wave 22 enters the BBO crystal 16 together with the laser beam 21, and they are converted into the sum frequency wave 23 at a wavelength of 355 nm. The periodically domain-inverted structure 51 in the LT crystal 50 enables the proper phase matching between the laser beam 21 and the second harmonic wave 22.

The linear-polarized laser beam 21 enters the LT crystal 50 with the plane of polarization thereof being aligned with the z axis of the LT crystal 50. This allows the effective utilization of the nonlinear optical constant $d_{33}$ of the LT crystal 50, and the outgoing second harmonic wave 22 from the LT crystal 50 is linear polarized along the z axis of the LT. Thus, since the laser beam 21 and the second harmonic wave 22, both which enter the BBO crystal 16, lie in the same plane of polarization, the laser beam 21 and the second harmonic wave 22 are properly phase matched in type-I with the sum frequency 23, whereby the efficiency of wavelength conversion is improved to a much greater extent. The same is true of the type-II phase matching.

The effective nonlinear optical constant $d_{33}$ of the LT crystal 50 provided with the periodically domain-inverted structure 51 is 16 pm/V, and this value is substantially larger than the nonlinear optical constant of the KTP crystal, i.e., 7 pm/V. By virtue of this difference in the nonlinear optical constant, the wavelength conversion efficiency is improved by about four times. It will be appreciated that the optical wavelength converter system, according to the third embodiment, is much improved in wavelength conversion efficiency when compared with the system previously exemplified in the first and second embodiments, because the system of the third embodiment dispenses with the phase compensator 17 or 41 used in the first and the second embodiments, leading to a decrease in the optical loss. According to this fourth embodiment, a sum frequency 23 of 5 mW is produced from the phase-coupled array laser having an output of 500 mW. Meanwhile, in the case of the conventional system similar to the system of the first embodiment, except for the phase compensator 17, the sum frequency produced by the same laser is only as small as 0.2 mW.

Figure 4:
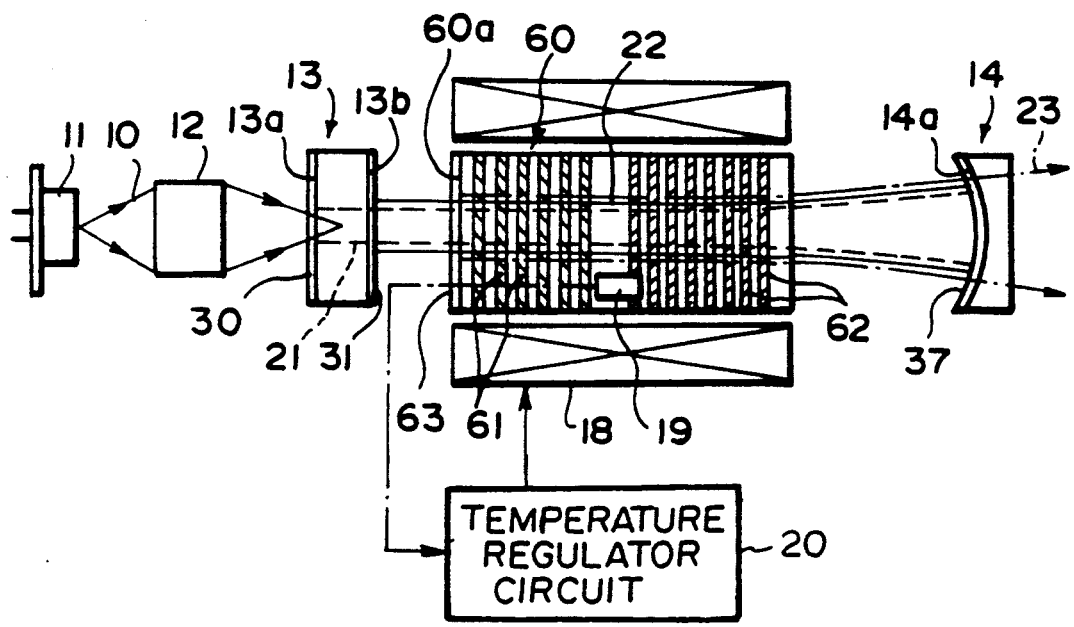
FIG. 4 is a diagrammatic side-sectional view showing an optical wavelength converter system according to a fourth embodiment of this invention.

Referring to FIG. 4, a fourth embodiment of this invention will now be described. An optical wavelength converter system, according to a fourth embodiment, is different from the system according to a first embodiment in that a single LT (LiTaO$_3$) crystal 60 is used instead of the KTP crystal 15 and the BBO crystal 16, and that the system dispenses with the phase compensator 17.

The LT crystal 60 is ground in such a manner that facets parallel to the z axis are turned to a beam transmission surface so that the largest nonlinear optical constant $d_{33}$ can be effectively utilized. This LT crystal 60 is comprised of a first periodically domain-inverted structure 61 and a second periodically domain-inverted structure 62, wherein both structures are defined by domain reversals which are arranged in the direction of beam transmission. The period Λ of the first and second periodically domain-inverted structures 61 and 62 is 8 μm and 2 μm, respectively.

The laser beam 21 emitted as the fundamental wave is converted into the second harmonic wave 22 at a wavelength of 532 nm at the area of the LT crystal 60 where the first periodically domain-inverted structure 61 is defined. This second harmonic wave 22 enters, along with the laser beam 21, the area of the LT crystal 60 where the second periodically domain-inverted structure 62 is defined. The second harmonic wave and the laser beam are then converted into the sum frequency 23 at a wavelength of 355 nm. The rear-side end surface 60a of the LT crystal 60 is covered with a coating 63 which enables a suitable transmission of the second harmonic wave 22 and the laser beam 21 and an appropriate reflection of the sum frequency 23.

The first periodically domain-inverted structure 61 of the LT crystal 60 effects a proper phase matching between the laser beam 21 and the second harmonic wave 22. A phase matching is further achieved among the laser beam 21, the second harmonic wave 22, and the sum frequency 23 by means of the second periodically domain-inverted structure 62.

As with the third embodiment, since the laser beam 21 and the second harmonic wave 22, both which enter the second periodically domain-inverted structure 62, are matched with each other in the plane of linear polarization, the laser beam and the second harmonic wave are appropriately phase matched with the sum frequency 23, thereby achieving the highly efficient wavelength conversion.

The utilization of the largest nonlinear optical constant $d_{33}$ of the LT crystal 60, as well as the elimination of the optical loss caused by the phase compensator, results in a high wavelength conversion efficiency. Moreover, in the fourth embodiment, the use of a common element, which serves as both the crystal of the nonlinear optical material for producing the second harmonic wave and the crystal of the nonlinear optical material for producing the sum frequency, leads to a wavelength converter element with two less facets when compared with the previously described embodiments, thereby achieving an optical loss reduced to a much lesser extent and an efficiency improved to a much greater extent. According to this embodiment, when the output of the phase-coupled array laser 11 is 500 mW, the sum frequency is 10 mW.

It should be understood that the foregoing $LiTaO_3$ may be replaced with anyone selected from the group consisting of $MgO-LiNbO_3$, KTP, $KnbO_3$, BBO, LBO as the nonlinear optical material for the production of the periodically domain-inverted structure.

It will be understood that the above description of the present invention is susceptible to various modifications, changes and adaptations and the same are intended to be comprehended within the meaning and range of equivalents of the appended claims.

What is claimed is:

1. An optical wavelength converter system, in which a second harmonic wave is produced by the introduction of a linear polarized laser beam into the crystal of a first non-linear optical material, and in which a sum frequency is generated by the introduction, into the crystal of a second non-linear optical material, of the second harmonic wave together with the laser beam, the improvement comprising:

a phase comparator means being disposed in the optical path of the laser beam and the second harmonic wave, both of which enter the crystal of the second non-linear optical material, so that the laser beam and the second harmonic wave are aligned substantially in the same direction of plane polarization.

2. An optical wavelength converter system as defined in claim 1, wherein the crystal of the first optical material is made of any crystal selected from the group consisting of a BBO crystal and a KTP crystal, and the crystal of the second optical material is made of a BBO crystal.

3. An optical wavelength converter system, in which a second harmonic wave is produced by the introduction of a linear polarized laser beam into the crystal of a first non-linear optical material, and in which a sum frequency is generated by the introduction, into the crystal of a second non-linear optical material, of the second harmonic wave together with the laser beam, the improvement comprising:

a crystal, for use as the crystal of the first non-linear optical material, which is provided with a periodically domain-inverted structure for matching, in phase, the laser beam with the second harmonic wave.

4. An optical wavelength converter system as defined in claim 3, wherein the crystal of the first non-linear material is made up of any crystal selected from the group consisting of an $LiTaO_3$ crystal, an $MgO-LiNbO_3$ crystal, a KTP crystal, a $KNbO_3$ crystal, a BBO crystal, and an LBO crystal.

5. An optical wavelength converter system, in which a second harmonic wave is produced by the introduction of a linear polarized laser beam into the crystal of a first non-linear optical material, and in which a sum frequency is generated by the introduction, into the crystal of a second non-linear optical material, of the second harmonic wave together with the laser beam, the improvement comprising:

a crystal of a non-linear optical material which is commonly used for both the crystals of the first and the second optical materials, and which includes a first periodically-domain inverted structure to match, in phase, the laser beam and the second harmonic wave, and a second periodically-domain inverted structure to match, in phase, the laser beam, the second harmonic wave and the sum frequency with one another.

6. An optical wavelength converter system as defined in claim 5, wherein the common crystal is made of any crystal selected from the group consisting of an $LiTaO_3$ crystal, an $MgO-LiNbO_3$ crystal, a KTP crystal, a $KNbO_3$ crystal, a BBO crystal, and an LBO crystal.

* * * * *